United States Patent [19]
Tsutsumi et al.

[11] Patent Number: 5,587,246
[45] Date of Patent: Dec. 24, 1996

[54] WATER-RESISTANT SURFACE COATING FORMULATIONS AND PAPER COATED THEREWITH

[75] Inventors: Haruki Tsutsumi; Yoshiaki Ikemoto, both of Kanagawa-ken; Mitsuhiro Maehama, Yamaguchi-ken; Toshiki Oyanagi; Tsugio Matsubara, both of Kanagawa-ken, all of Japan

[73] Assignee: Mitsui Toatsu Chemicals, Inc., Tokyo, Japan

[21] Appl. No.: 450,149

[22] Filed: May 26, 1995

Related U.S. Application Data

[62] Division of Ser. No. 248,183, May 24, 1994, Pat. No. 5,470,918.

[30] Foreign Application Priority Data

May 28, 1993 [JP] Japan .................................. 5-126829

[51] Int. Cl.$^6$ .................................. B32B 23/08; B32B 27/10
[52] U.S. Cl. .................................. 428/511; 427/391; 428/514
[58] Field of Search .................................. 427/391; 428/507, 428/511, 514

[56] References Cited

U.S. PATENT DOCUMENTS

| | | | |
|---|---|---|---|
| Re. 30,259 | 4/1980 | Moriya et al. .................. | 162/167 |
| 4,603,176 | 7/1986 | Bjorkquist et al. .............. | 525/329.4 |
| 4,623,462 | 11/1986 | Urig .................................. | 427/391 X |
| 4,980,024 | 12/1990 | Payne et al. ...................... | 427/391 X |
| 5,008,344 | 4/1991 | Bjorkquist ....................... | 525/328.2 |

FOREIGN PATENT DOCUMENTS

| | | |
|---|---|---|
| 345566 | 12/1989 | European Pat. Off. . |
| 40-13686 | 7/1965 | Japan . |
| 44-26670 | 11/1969 | Japan . |
| 53-38705 | 4/1978 | Japan . |
| 56-18713 | 5/1981 | Japan . |

*Primary Examiner*—Michael Lusignan
*Attorney, Agent, or Firm*—Burns, Doane, Swecker & Mathis

[57] ABSTRACT

The present invention provides a water-resistant surface coating formulation comprising a reaction product obtained by subjecting an acrylamide polymer to a crosslinking reaction with 0.1 to 20 parts by mole, per 100 parts by mole of amido groups in the acrylamide polymer, of a glyoxal-monoureine; a method for improving the water resistance of paper by using the formulation; and coated paper so obtained. As a result of improved water resistance of the coating formulation, this invention makes it possible to conduct coating work stably.

8 Claims, No Drawings

WATER-RESISTANT SURFACE COATING FORMULATIONS AND PAPER COATED THEREWITH

This application is a divisional of application No. 08/248,183, filed May 24, 1994, now U.S. Pat. No. 5,470,918, patented Nov. 28, 1995.

BACKGROUND OF THE INVENTION

1. Field of the Invention

This invention relates to a water-resistant surface coating formulation and also to paper coated therewith. More specifically, the present invention is concerned with a water-resistant surface coating formulation containing a reaction product of an acrylamide polymer and a glyoxalmonoureine, a method for improving the water resistance of paper by using the coating formulation, and coated paper so obtained.

2. Description of the Related Art

There is an outstanding desire for improvements in the water resistance of a surface coating formulation for paper, particularly for newsprint paper and printing paper, because they are printed by offset printing which requires dampening water.

Various surface coating resins have heretofore been employed to reduce separation of dust and/or filler from paper and/or to improve the surface strength and printing applicability of paper. Preferred conventional examples of such coating resins include starch, oxidized starch and modified products thereof as natural products, carboxymethylcellulose and hydroxymethylcellulose as semisynthetic products, and polyvinyl alcohol, polyacrylamide and derivatives thereof as synthetic products. Furthermore, many resins such as urea resins, melamine resins, water-soluble epoxy resins, styrene-maleic acid copolymers, polyvinyl acetate, vinyl acetate-maleic acid copolymers, latex resins and emulsion resins are used according to the application purpose. They are used either singly or in combination. Among these surface coating resins, starch, polyvinyl-base and polyacrylamide-base resins are employed preferably.

Although the above exemplified surface coating resins are significantly effective for obtaining paper having improved surface quality, they cause a variety of problems in relation to dampening water used at the time of offset printing. Examples of the problem include frequent paper break which occurs because a surface coating resin dissolved by dampening water sticks on rollers and paper winds itself around these rollers; an adverse effect on the control of release of paper dust; and irregular coating and deteriorated printing applicability attributable to localized dissolution of a surface coating resin.

To cope with these problems, it is the general approach to improve the water resistance of a coating resin. For starch or polyvinyl alcohol resins, it is the common practice to improve the water resistance by incorporating an epoxy resin or melamine resin. The starch resin having improved water resistance, however, requires a cumbersome dissolution step, and also involves other problems such as proneness to mildew and short service life after dissolution. The polyvinyl alcohol resins are also accompanied with problems such as irksome dissolution and troublesome post-dissolution foaming.

Polyacrylamide resins are also used after being mixed or being partially reacted with a urea resin, melamine resin, epoxy resin, zirconium salt, glyoxal, ketone resin, wax emulsion and/or various sizing agents. Japanese Patent Publication Nos. 13686/1965 and 26670/1969 (U.S. Pat. No. 3,853,816 et al.), for example, disclose a technique to react acrylamide with glyoxal, thereby improving the water resistance of the polyacrylamide resin. Japanese Patent Laid-Open No. 38705/1978 (U.S. Pat. No. 4,122,071, U.S. Pat. No. 4,170,672) and Japanese Patent Publication No. 18713/1981 disclose a technique to improve the water resistance of a polyacrylamide resin by using a glycidyl-containing monomer. When glyoxal or the glycidyl-containing monomer is added in an amount sufficient to improve the water resistance in the above technique, however, the coating resin so obtained is not stable in quality, for example, severe coloring occurs or its service life is too short.

Modification of coating resins with a chemical substance is also under investigation. Use of a formaldehyde-containing composition as a modifier should however be avoided in view of the troublesome odor of formaldehyde. From the viewpoint of environmental protection, it should also be avoided to use as a modifier a chlorine compound which is a cause for dioxin contamination. Regarding paper quality, there is a demand for paper having high performance sufficient to meet diversified requests, for example, having superior water resistance without deterioration in surface strength and printing applicability.

It is the present situation that no surface coating resin having both long service life and superior water resistance has been developed yet.

OBJECTS AND SUMMARY OF THE INVENTION

An object of the present invention is to provide a surface coating formulation having improved water resistance and also paper coated with the formulation. Another object of the invention is to provide a surface coating formulation which has long service life and stable quality and permits stable coating work. A further object of the invention is to provide a surface coating formulation free of problems in pollution and the like.

With the forgoing problems in view, the present inventors have conducted extensive research and, by partially crosslinking amido groups in a hydrophilic acrylamide resin to make it hydrophobic, hence completed the present invention.

The present invention therefore provides a water-resistant surface coating formulation comprising a reaction product obtained by reacting an acrylamide polymer, which is a polymer or copolymer of an acrylamide represented by the following formula (1):

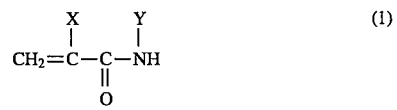

wherein X represents H or $CH_3$ and Y represents H or $CH_2OH$, with 0.1 to 20 mole parts, per 100 parts by mole of amido groups in the acrylamide polymer, of a glyoxalmonoureine represented by the following formula (2):

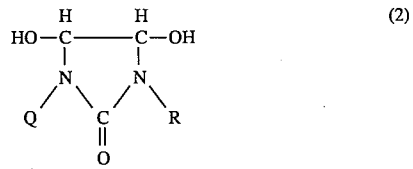

wherein Q and R independently represent H, CH$_3$ or CH$_2$OH.

DETAILED DESCRIPTION OF THE INVENTION

Examples of the acrylamide polymer usable in the present invention include polymers and copolymers of acrylamides and copolymers of an acrylamide with at least one of (meth) acrylic acid, acrylonitrile and itaconic acid. Illustrative of the acrylamides include acrylamide, methacrylamide and N-substituted acrylamides such as N-methylolacrylamide, diacetone acrylamide, N,N-dimethylacrylamide, N,N-dimethylmethacrylamide, N-ethylacrylamide, N-ethylmethacrylamide, N,N-diethylacrylamide, N-propylacrylamide, 2-acrylamido-2-methylpropanesulfonic acid, 2-acrylamido-2-phenylpropanesulfonic acid, N,N-dimethylaminopropyl acrylamide, N,N-dimethylaminopropyl methacrylamide, N,N-dipropylacrylamide, N-butylacrylamide, N-hexylacrylamide, N-hexylmethacrylamide, N-octylacrylamide, N-octylmethacrylamide, N-dodecylacrylamide and N-dodecylmethacrylamide.

The comonomer component, such as (meth) acrylic acid, acrylonitrile and/or itaconic acid, of each acrylamide polymer may be used in an amount of 0 to 40 parts by mole relative to 100 to 60 parts by mole of the acrylamide, preferably 3 to 30 parts by mole relative to 97 to 70 parts by mole of the compound. If the amount of the comonomer component is greater than 40 parts by mole, the resulting surface coating formulation is deteriorated in film forming property, surface strength under dry or wet conditions, controlling effects of paper dust or the like. Amounts outside the above range are therefore not preferred. As the comonomer component, (meth)acrylic acid, acrylonitrile and itaconic acid may be used either singly or in any desired combinations.

In addition, the following substances can be added within a range of 0 to 5 mole %. Examples include ethylenically-unsaturated carboxylic acids such as maleic acid, fumaric acid and crotonic acid; aromatic vinyl compounds such as styrene, α-methylstyrene, vinyltoluene and divinylbenzene; alkyl methacrylates such as ethyl acrylate, butyl acrylate, 2-ethylhexyl acrylate, methyl methacrylate, ethyl methacrylate, butyl methacrylate and 2-ethylhexyl methacrylate; hydroxyalkyl (meth)acrylates such as hydroxyethyl acrylate and hydroxyethyl methacrylate; vinyl pyrrolidone; glycidyl acrylate; glycidyl methacrylate; vinyl acetate; vinyl chloride; vinylidene chloride; methacrylonitrile and methylenebisacrylamide.

Acrylamide polymers can be produced by known radical polymerization. Although no particular limitation is imposed on a polymerization catalyst, persulfates such as potassium persulfate, sodium persulfate and ammonium persulfate—conventional water-soluble radical generators; peroxides such as hydrogen peroxide and benzoyl peroxide; and redox catalysts making use of the above peroxides in combination with reducing agents such as acidic sodium sulfite and sodium thiosulfate can be employed. These redox catalysts are preferred because they permit polymerization at low temperatures. No limitation is imposed on the polymerization temperature. It it however desirable to initiate polymerization at 20° to 40° C. in view of the polymerization heat of (meth) acrylamide.

A description will next be made of the reaction between an acrylamide polymer and a glyoxalmonoureine.

The glyoxalmonoureine of the formula (2) is employed to efficiently crosslink amido groups in the acrylamide polymer so that the polymer is made hydrophobic. Examples of the glyoxalmonoureine represented by the formula (2) include glyoxalmonoureine, monomethylol glyoxalmonoureine, dimethylol glyoxalmonoureine, monomethyl glyoxalmonoureine, dimethyl glyoxalmonoureine and monomethylmonomethylol glyoxalmonoureine. When the glyoxalmonoureine is used in an amount of 0.1 to 20 parts by mole, preferably 0.5 to 15 parts by mole, per 100 parts by mole of the amido groups in the acrylamide polymer, a product having a suitable degree of water resistance can be obtained. Amounts smaller than 0.1 part by mole cannot bring about any significant improvement in water resistance. Amounts greater than 20 parts by mole, on the other hand, result in an excessive improvement in water resistance thereby making it difficult to recycle brokes and waste paper. Amounts outside the above range are therefore not preferred.

The reaction between the acrylamide polymer and the glyoxalmonoureine is generally conducted in the form of an aqueous solution. As reaction conditions, they are usually reacted at 50°–80° C. for about 1–3 hours.

By forming cross-linkage between the individual molecules of the acrylamide polymer as described above, it is possible to obtain a resin having resistance to dampening water at the time of offset printing or the like.

The reaction product so obtained from the acrylamide polymer and the glyoxalmonoureine has ordinarily a concentration of 5 to 25 wt. % and a solution viscosity of 500 to 15,000 cps as measured at 25° C., although they vary depending on the molecular weight of the reaction product.

The surface coating formulation according to the present invention may further contain a sizing agent, a water repellent and/or a waterproofing agent, such as a wax, an alkenyl succinate, rosin and/or an alkylketen dimer, which impart water repellent property. Metal salts such as zirconium ammonium carbonate, zirconyl acetate, zirconyl nitrate, basic zirconium carbonate, zirconyl phosphate and zirconyl hydroxide, various resins, emulsions and latexes can also be used in combination.

Conventional processing methods can be used to apply the thus-prepared surface coating formulation to paper. For example, paper can be coated by a coater such as a gate roll coater, calender roll coater, roll coater or air knife coater. Alternatively, paper can be treated by a method such as impregnation or spraying.

The water-resistant resin according to the present invention is used in a manner known per se in the art. To adjust the coat weight according to the degree of waterproofness required, the surface coating formulation may be used neat or after diluted with water or the like as needed.

The water-resistant coating formulation of the present invention applied to paper exhibits excellent initial water resistance against dampening water at the time of offset printing without impairing printing applicability or causing the problem of paper dust. It can, therefore, be provided as a useful resin for which there is an outstanding need.

The present invention will hereinafter be described in further detail by Examples and Comparative Examples. It is to be noted that these examples are merely illustrative and are not intended to limit the present invention thereto.

Incidentally, all designations of "%" and "part" or "parts" mean wt. % and part or parts by weight unless otherwise specifically designated.

EXAMPLE 1

In a 1-l separable flask, 485 g of water and 450.7 g of a 40% aqueous solution of acrylamide were charged and were stirred and mixed at room temperature. To the resulting mixture, 1/10N hydrochloric acid was added to adjust its pH to 6.0. The internal temperature was then raised to 35° C., followed by the addition of 10 ml of a 10% aqueous solution of potassium persulfate and, 5 minutes later, 5 ml of a 10% aqueous solution of acidic sodium sulfite. The reaction then proceeded rapidly with exotherm. About 10 minutes later, the internal temperature arose to 91° C. and the reaction mixture turned into a viscous aqueous solution. The reaction was continued for further one hour, whereby an aqueous polymer solution having a solid content of 18% and a viscosity of 50 poises was obtained. The aqueous polymer solution was then added with 49.5 g of a 40% aqueous solution of dimethyl glyoxalmonoureine while being kept at 65°–70° C. They were reacted at the same temperature for 3 hours, whereby Reaction Product 1 having a solid content of 20% and a viscosity of 57 poises at 25° C. was obtained.

The molar ratio of the acrylamide to the dimethyl glyoxalmonoureine in Reaction Product 1 was 95:5.

EXAMPLE 2

In a similar manner to Example 1 except that 485 g of water and 407 g of a 40% aqueous solution of acrylamide were charged and 93 g of a 40% aqueous solution of dimethyl glyoxalmonoureine were added, Reaction Product 2 having a solid content of 20% and a viscosity of 49 poises at 25° C. was obtained.

The molar ratio of the acrylamide to the dimethyl glyoxalmonoureine in Reaction Product 2 was 90:10.

EXAMPLE 3

In a similar manner to Example 1 except that 485 g of water and 441.8 g of a 40% aqueous solution of acrylamide were charged and 61.8 g of a 38% aqueous solution of dimethylol glyoxalmonoureine were added, Reaction Product 3 having a solid content of 20% and a viscosity of 53 poises at 25° C. was obtained.

The molar ratio of the acrylamide to the dimethylol glyoxalmonoureine in Reaction Product 3 was 95:5.

EXAMPLE 4

In a similar manner to Example 1 except that 485 g of water and 391.0 g of a 40% aqueous solution of acrylamide were charged and 113.9 g of a 38% aqueous solution of dimethylol glyoxalmonoureine were added, Reaction Product 4 having a solid content of 20% and a viscosity of 59 poises at 25° C. was obtained.

The molar ratio of the acrylamide to the dimethylol glyoxalmonoureine in Reaction Product 4 was 90:10.

EXAMPLE 5

In a similar manner to Example 1 except that 498 g of water, 384.3 g of a 40% aqueous solution of acrylamide, 6.24 g of an 80% aqueous solution of acrylic acid and 3.68 g of acrylonitrile were charged and 13.5 ml of a 10% aqueous solution of potassium persulfate, 6.7 ml of a 10% aqueous solution of acidic sodium sulfite and 94 g of a 40% aqueous solution of dimethyl glyoxalmonoureine were added, Reaction Product 5 having a solid content of 20% and a viscosity of 55 poises at 25° C. was obtained.

The molar ratio (%) of the acrylamide, the acrylic acid and the acrylonitrile in Reaction Product 5 was 94:3:3, while the molar ratio of the whole vinyl monomers to the dimethyl glyoxalmonoureine was 90:10.

EXAMPLE 6

In a similar manner to Example 1 except that 504 g of water, 345 g of a 40% aqueous solution of acrylamide, 6.1 g of an 80% aqueous solution of acrylic acid and 8.79 g of itaconic acid were charged and 13.5 ml of a 10% aqueous solution of potassium persulfate, 6.7 ml of a 10% aqueous solution of acidic sodium sulfite and 91 g of a 40% aqueous solution of dimethyl glyoxalmonoureine were added, Reaction Product 6 having a solid content of 20% and a viscosity of 47 poises at 25° C. was obtained.

The molar ratio of the acrylamide, the acrylic acid and the itaconic acid in Reaction Product 6 was 94:3:3, while the molar ratio of the whole vinyl monomers to the dimethyl glyoxalmonoureine was 90:10.

EXAMPLE 7

In a similar manner to Example 1 except that 497 g of water, 360.5 g of a 40% aqueous solution of acrylamide, 5.83 g of an 80% aqueous solution of acrylic acid and 8.43 g of itaconic acid were charged and 13.5 ml of a 10% aqueous solution of potassium persulfate, 6.7 ml of a 10% aqueous solution of acidic sodium sulfite and 112.5 g of a 38% dimethylol glyoxalmonoureine were added, Reaction Product 7 having a solid content of 20% and a viscosity of 46 poises at 25° C. was obtained.

The molar ratio of the acrylamide, the acrylic acid and the itaconic acid in Reaction Product 7 was 94:3:3, while the molar ratio of the whole vinyl monomers to the dimethylol glyoxalmonoureine was 90:10.

COMPARATIVE EXAMPLE 1

In a 1-l separable flask, 485 g of water and 500 g of a 40% aqueous solution of acrylamide were charged and were stirred and mixed at room temperature. To the resulting mixture, 1/10N hydrochloric acid was added to adjust its pH to 6.0. As soon as the internal temperature reached 35° C., 10 ml of a 10% aqueous solution of potassium persulfate and, 5 minutes later, 5 ml of a 10% aqueous solution of acidic sodium sulfite were added to the reaction mixture. The reaction proceeded rapidly with exotherm. About 10 minutes later, the internal temperature arose to 90° C., forming a viscous aqueous solution. After the reaction was continued for further one hour, the reaction mixture was cooled down to 80° C. and then neutralized with 1/10N caustic soda, whereby an aqueous acrylamide polymer solution having a solid content of 20% and a viscosity of 45 poises at 25° C. was obtained.

COMPARATIVE EXAMPLE 2

The reaction was conducted in a similar manner to Example 1 except that 485 g of water and 266.9 g of acrylamide were charged and 233 g of a 40% aqueous solution of dimethyl glyoxalmonoureine were added. About one hour after the addition of dimethyl glyoxalmonoureine, gelation occurred and the resulting gel started winding itself around a stirring rod, so that the reaction was terminated. The molar ratio of the acrylamide to the dimethyl glyoxalmonoureine in the mixture was 70:30.

COMPARATIVE EXAMPLE 3

As prior art, a 10% aqueous solution of commercially-available PVA was employed as Comparative Example 3.

According to an evaluation testing method which will be described below, the compositions obtained in Examples 1–7, the aqueous acrylamide polymer solution obtained in Comparative Example 1 and the 10% aqueous PVA solution in Comparative Example 3 were compared. Testing methods for the evaluation of performance as paper surface coating formulations:

1. Test for judgment of initial water resistance

In this test, measurement is made according to the procedures described below under (1) to (7). Test results indicate the resistance of coated samples to water. Low peeling strength suggests that the coated sample is rather free from break, that is, the phenomenon which occurs when the surface coating resin dissolved by dampening water sticks on rollers upon printing and paper winds itself around the rollers.

(1) Provide a blade coater for testing. Using the coater, coat in advance water to newsprint base paper having a basis weight of 48 g/m$^2$ and calculate the coating build-up of water per m$^2$.

(2) Based on the coating build-up of water so calculated, adjust the concentrations of the compositions in Examples 1 to 7 and the aqueous resin solutions in Comparative Examples 1 and 3 to 4–8% to give resin coat weights of 0.3 and 0.6 g/m$^2$.

(3) Weigh each base paper precisely to the unit of 1 mg and provide a drum drier preset at 105° C. in advance.

(4) Set the precisely-weighed base paper on the blade coater and apply each aqueous solution to the paper while operating the coater. Measure the coat weight, dry the paper in a drum drier and then subject the dried paper to seasoning at constant temperature and humidity of 20° C. and 65% for 24 hours. Provide two sheets of coated paper in the above manner.

(5) Warm up a laboratory mini-calender to 50° C. in advance. Fill a shallow vat with water. Provide a No.2 square filter paper whose width is a little greater than the coated paper.

(6) Place one of the coated papers on water so that its coated surface is brought into contact with water. Bring the paper into a contiguous relation with the other one, i.e., the dry paper so that their coated surfaces are bonded together. Place the bonded sample so obtained between two sheets of the filter paper and pass them through a calender. Repeat this operation three times with replacement of the filter paper after each operation. Subject the bonded sample to seasoning overnight in an air-conditioned chamber.

(7) Cut the bonded sample so obtained into widths of 3 cm. Peel off the sample at a part thereof and then peel it off from the peeled part by using a Tensilon tensile tester to measure its peeling strength.

2. Water solubility test

The compositions obtained in Examples 1 to 7 and aqueous polymer solutions obtained in Comparative Examples 1 and 3 were weighed, about 10 g each, in aluminum cups, respectively. They were diluted with a suitable amount of water and then dried for 24 hours in a room-temperature vacuum drier, whereby films were obtained. About 0.5 g of each film was weighed precisely, placed in a 100-ml Erlenmeyer flask and added with 50 ml of water, followed by stirring on a shaker for 5 minutes. Any undissolved part of the film was thereafter taken out of the flask and dried at 105° C. for 2 hours. The weight of the film after dried was measured and the amount of the film dissolved in water was determined.

Results of the water solubility test are shown in Table-1.

TABLE 1

| Test No. | Resin coat weight (g) and peeling strength* | | Weight dissolved in water (%) |
|---|---|---|---|
| | A | B | |
| Example 1 | 12 | 21 | 4 |
| Example 2 | 10 | 18 | 2 |
| Example 3 | 11 | 23 | 3 |
| Example 4 | 9 | 17 | 3 |
| Example 5 | 10 | 20 | 3 |
| Example 6 | 13 | 25 | 2 |
| Example 7 | 13 | 21 | 3 |
| Comp. Ex. 1 | 68 | 103 | 13 |
| Comp. Ex. 3 | 203 | 298 | 3 |

*A indicates peeling strength at a coat weight of 0.3 g/m$^2$ and B at 0.6 g/m$^2$.

As can be seen from Table 1, the bonded sample coated with any one of the surface coating formulations according to the present invention had relatively low peeling strength and the film formed from any one of the surface coating formulations according to this invention had a small weight dissolved in water, thereby demonstrating effects of crosslinking. This indicates that the reaction product in each surface coating composition according to this invention had low solubility in water and has resistance to water at the time of offset printing. In Comparative Example 1, on the other hand, the bonded sample had high peeling strength and the film had a large weight dissolved in water. In Comparative Example 3, the weight dissolved in water is small but the peeling strength is extraordinarily high, thereby indicating the existence of a problem.

We claim:

1. A method for improving the water resistance of paper, which comprises coating the paper with a water-resistant surface coating formulation comprising a reaction product obtained by reacting an acrylamide polymer of at least one acrylamide monomer represented by the following formula (1):

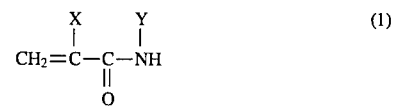

wherein X represents H or CH$_3$ and Y represents H or CH$_2$OH, and, optionally, at least one comonomer selected from the group consisting of acrylic acid, methacrylic acid, acrylonitrile and itaconic acid, with 0.1 to 20 parts by mole, per 100 parts by mole of amido groups in the acrylamide polymer, of a glyoxalmonoureine represented by the following formula (2):

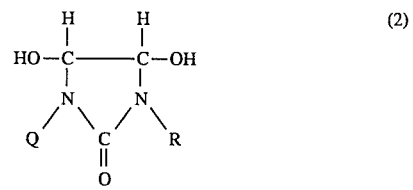

wherein Q and R independently represent H, CH$_3$ or CH$_2$OH; wherein the acrylamide polymer is produced from 100 to 60 parts by mole of the at least one acrylamide represented by the formula (1) and 0 to 40 parts by parts by mole of at least one comonomer selected from the group consisting of acrylic acid, methacrylic acid, acrylonitrile and itaconic acid.

2. The method of claim 1, wherein the glyoxalmonoureine represented by formula (2) is selected from the group consisting of glyoxalmonoureine, monomethylol glyoxalmonoureine, dimethylol glyoxalmonoureine, monomethyl glyoxalmonoureine, dimethyl glyoxalmonoureine and monomethylmonomethylol glyoxalmonoureine.

3. The method of claim 1, wherein the glyoxalmonoureine has been reacted in an amount of 0.5–15 parts by mole per 100 parts by mole of amido groups in the acrylamide polymer.

4. The method of claim 1, wherein the acrylamide polymer has been obtained by polymerizing 97 to 70 parts by mole of the acrylamide represented by formula (1) and 3 to 30 parts by mole of the comonomer component.

5. Paper coated with a water-resistant surface coating formulation comprising a reaction product obtained by reacting an acrylamide polymer of at least one acrylamide monomer represented by the following formula (1):

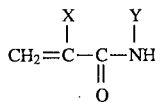

wherein X represents H or CH$_3$ and Y represents H or CH$_2$OH, and, optionally, at least one comonomer selected from the group consisting of acrylic acid, methacrylic acid, acrylonitrile and itaconic acid, with 0.1 to 20 parts by mole, per 100 parts by mole of amido groups in the acrylamide polymer, of a glyoxalmonoureine represented by the following formula (2):

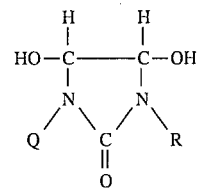

wherein Q and R independently represent H, CH$_3$ or CH$_2$OH; wherein the acrylamide polymer is produced from 100 to 60 parts by mole of the at least one acrylamide represented by the formula (1) and 0 to 40 parts by parts by mole of at least one comonomer selected from the group consisting of acrylic acid, methacrylic acid, acrylonitrile and itaconic acid.

6. The paper of claim 5, wherein the glyoxalmonoureine represented by formula (2) is selected from the group consisting of glyoxalmonoureine, monomethylol glyoxalmonoureine, dimethylol glyoxalmonoureine, monomethyl glyoxalmonoureine, dimethyl glyoxalmonoureine and monomethylmonomethylol glyoxalmonoureine.

7. The paper of claim 5, wherein the glyoxalmonoureine has been reacted in an amount of 0.5–15 parts by mole per 100 parts by mole of amido groups in the acrylamide polymer.

8. The paper of claim 5, wherein the acrylamide polymer has been obtained by polymerizing 97 to 70 parts by mole of the acrylamide represented by formula (1) and 3 to 30 parts by mole of the comonomer component.

* * * * *